(12) United States Patent
Bauer et al.

(10) Patent No.: US 7,108,935 B2
(45) Date of Patent: Sep. 19, 2006

(54) ION CONDUCTING COMPOSITE MEMBRANE MATERIALS CONTAINING AN OPTIONALLY MODIFIED ZIRCONIUM PHOSPHATE DISPERSED IN A POLYMERIC MATRIX, METHOD FOR PREPARATION OF THE MEMBRANE MATERIAL AND ITS USE

(75) Inventors: Bernd Bauer, Vaihingen an der Enz (DE); Jacques Roziere, St Martin de Londres (FR); Deborah Jones, St Martin de Londres (FR); Giulio Alberti, Perugia (IT); Mario Casciola, Perugia (IT); Monica Pica, Gualda Tadino (IT)

(73) Assignee: Fuma-Tech Gesellschaft fur Funktionelle Membranen und Anlagentechnologie mbH, Ingbert (DE)

( * ) Notice: Subject to any disclaimer, the term of this patent is extended or adjusted under 35 U.S.C. 154(b) by 0 days.

(21) Appl. No.: 10/507,432

(22) PCT Filed: Mar. 12, 2003

(86) PCT No.: PCT/EP03/02550

§ 371 (c)(1),
(2), (4) Date: Feb. 10, 2005

(87) PCT Pub. No.: WO03/077340

PCT Pub. Date: Sep. 18, 2003

(65) Prior Publication Data

US 2005/0118480 A1    Jun. 2, 2005

(30) Foreign Application Priority Data

Mar. 13, 2002  (IT)  .......................... PG2002A0013

(51) Int. Cl.
*H01M 8/10* (2006.01)

(52) U.S. Cl. ..................... 429/33; 429/30; 429/41; 429/46; 429/40; 502/208; 427/115

(58) Field of Classification Search ................. 429/33, 429/30, 40, 41, 46; 502/208; 427/115
See application file for complete search history.

(56) References Cited

U.S. PATENT DOCUMENTS 4,609,484 A * 9/1986 Alberti et al. .............. 252/184

(Continued)

OTHER PUBLICATIONS

Alberti, G. et al. "Protonic conductivity of layered zirconium phosphonates containing -$SO_3H$ groups. I. Preparation and characterization of a mixed zirconium phosphonate of composition Zr $(O_3PR)_{0.73}(O_3PR')_{1.27}$-$nH_2O$, with R=-$C_6H_4$-$SO_3H$ and R'=-$CH_2$-OH", Solid State Ionics, vol. 50, pp. 315-322, 1992.

(Continued)

*Primary Examiner*—Ling-Sui Choi
(74) *Attorney, Agent, or Firm*—Nath & Associates PLLC; Gary M. Nath; Tanya E. Harkins (57) ABSTRACT

The invention provides composite membrane materials comprising a polymer of the state of art uniformly filled with a zirconium phosphate, preferably α-zirconium phosphate or zirconium phosphate sulfoarylenphosphonate particels. The composite membrane materials are preferably prepared starting from a solution of a polymer of the state of art and from a colloidal dispersion of α-zirconium phosphate or a zirconium phosphate sulfoarylenphosphonate. The colloidal particles are transferred into the solution of the polymer preferably by mixing the dispersion with the solution or by means of phase transfer. The membrane material is preferably obtained by removing the solvent by evaporation or by a suitable non-solvent. Besides the composite membrane materials and the preparation methods, the use of the above membrane materials is claimed as ionomeric membranes with high overall performance in high tempreature, especially hydrogen, and in indirect methanol fuel cells and with decreased methanol crossover in direct methanol fuel cells.

22 Claims, 9 Drawing Sheets

U.S. PATENT DOCUMENTS

| | | | | |
|---|---|---|---|---|
| 4,629,656 | A | * | 12/1986 | Alberti et al. ............ 428/411.1 |
| 5,133,857 | A | * | 7/1992 | Alberti et al. ............... 204/425 |
| 5,344,548 | A | * | 9/1994 | Alberti et al. ............... 204/424 |
| 5,453,172 | A | * | 9/1995 | Alberti et al. ............... 204/421 |
| 5,919,583 | A | * | 7/1999 | Grot et al. ..................... 429/33 |
| 5,993,768 | A | * | 11/1999 | Zappelli et al. ............. 423/305 |
| 6,156,184 | A | | 12/2000 | Antonucci et al. |
| 6,447,943 | B1 | | 9/2002 | Peled et al. |
| 6,492,047 | B1 | | 12/2002 | Peled et al. |
| 2002/0058173 | A1 | * | 5/2002 | Alberti et al. ................ 429/30 |

OTHER PUBLICATIONS

Alberti, G. et al. "Protonic conductivity of layered zirconium phosphonates containing -$SO_3H$ groups. III. Preparation and characterization of γ-zirconium sulfoaryl phosphonates", *Solid State Ionics*, vol. 84 pp. 97-104, 1996.

Alberti, G. et al. "Preparation, characterization and proton conductivity of titanium phosphate sulfophenylphosphonate", *Solid State Ionics*, vol. 145 pp. 249-255, 2001.

Clearfield, A. "Structural concepts in inorganic proton conductors", *Solid State Ionics*, vol. 46 pp. 35-43, 1991.

Schutz, P. et al. "Materials for Medium Temperature Solid State Fuel Cells", Abstract No. 169 p. 248-249, 1987.

Alberti, G. et al. "Solid State protonic conductors, present main applications and future prospects", *Solid State Ionics*, vol. 145 pp. 3-16, 2001.

Alberti, G. et al. "All Solid State Hydrogen Sensors Based on Pellicular α-Zirconium Phosphate as a Protonic Conductor", *Solid State Ionics*, vol. 35 pp. 153-156, 1989.

Bonnet, B. et al. "Hybrid organic-inorganic membranes for a medium temperature fuel cell", *Journal of New Materials for Electromechanical Systems*, vol. 3 pp. 87-92, 2000.

Norby, T. "Solid-state protonic conductors: principles, properties, progress and prospects", *Solid State Ionics*, vol. 125, pp. 1-11, 1999.

Alberti, G. et al. "Inorganic Ion-Exchange Pellicles Obtained by Delamination of α-Zirconium Phosphate Crystals", *Journal of Colloid and Interface Science*, vol. 107 (1) pp. 256-263, 1985.

* cited by examiner

ION CONDUCTING COMPOSITE MEMBRANE MATERIALS CONTAINING AN OPTIONALLY MODIFIED ZIRCONIUM PHOSPHATE DISPERSED IN A POLYMERIC MATRIX, METHOD FOR PREPARATION OF THE MEMBRANE MATERIAL AND ITS USE

Fuel cells (FC) using a proton conducting polymeric membrane as a solid electrolyte are today the more suitable ones for electrical vehicles and portable electrical devices. As well known, three main types of fuel cells (which usually take the name of the fuel they use) are presently the object of an intense research: fuel cells fed with pure hydrogen (hydrogen FC), with hydrogen contained in the reforming gas ("indirect" methanol FC) and with pure methanol gas or an aqueous solution of methanol ("direct" methanol FC). The proton conducting membrane plays an important role so that, in order to have a good performance, specific characteristics of the membrane are required for each type of the said cells. For their high protonic conductivity at low temperature and excellent chemical stability, perfluorocarboxysulfonic membranes, such as Nafion, are today the most suitable for hydrogen FC. However, Nafion membranes are very expensive and, furthermore, their efficiency decreases at temperatures>70–80° C., due to the difficulty of maintaining the whole membrane hydrated at higher temperatures.

The said limitation in the working temperature complicates the cooling of the stacks; furthermore, when Nafion membranes are used in "indirect methanol FC", the reforming gas has to be accurately purified from the presence of carbon monoxide. This is because, especially at low temperatures, CO poisons the anodic catalyser. This occurs even at levels as low as 10 ppm because of the formation of a Pt—CO adduct. However, since this adduct is thermo labile, working temperatures around 120–140° C. should be high enough to prevent its formation, thus allowing hydrogen produced by reforming of alkanols or hydrocarbons to be used as a fuel. Finally, Nafion membranes exhibit high permeability to methanol; therefore they cannot be used in "direct" methanol FC.

The problem to obtain polymeric proton conducting membranes combining good mechanical properties with low methanol permeability and/or high proton conductivity above 70–80° C. can be overcome with at least two different strategies: 1) synthesis of new ionomers possessing the desired properties, 2) improvement of properties of ionomers of the state of art by adding inorganic particles which are able to reduce the membrane permeability to methanol, owing to their shape and size, and/or to facilitate (or even increase) the ionomer hydration above 80° C., owing to their hydrophilic character.

As far as the second strategy is concerned, according to the patent U.S. Pat. No 5,523,181, an improvement of humidification of perfluorocarboxysulfonic membranes can be obtained by dispersing particles of silica gel in the above membranes. This modification allows the fuel cell to be operated at reduced relative humidity although at temperature below 100° C. Higher working temperatures can be achieved with a suitable thermal treatment of the silica modified membrane according to the patent EP 0 926 754.

Furthermore, according to the international patent WO96/29752, the permeability to methanol is indeed reduced by adding inorganic particles among which, in particular, zirconium phosphate. Relatively to the problem of an excessive methanol permeability, the recent industrial success in the preparation of nanopolymers filled with organophilic clays clearly indicated that the presence of lamellar particles can decrease to a great extent the gas permeability of the polymeric matrix. This is a consequence of the fact that, during the extrusion process, the lamellar particles tend to orientate themselves parallel to the membrane surface.

Figure 1:
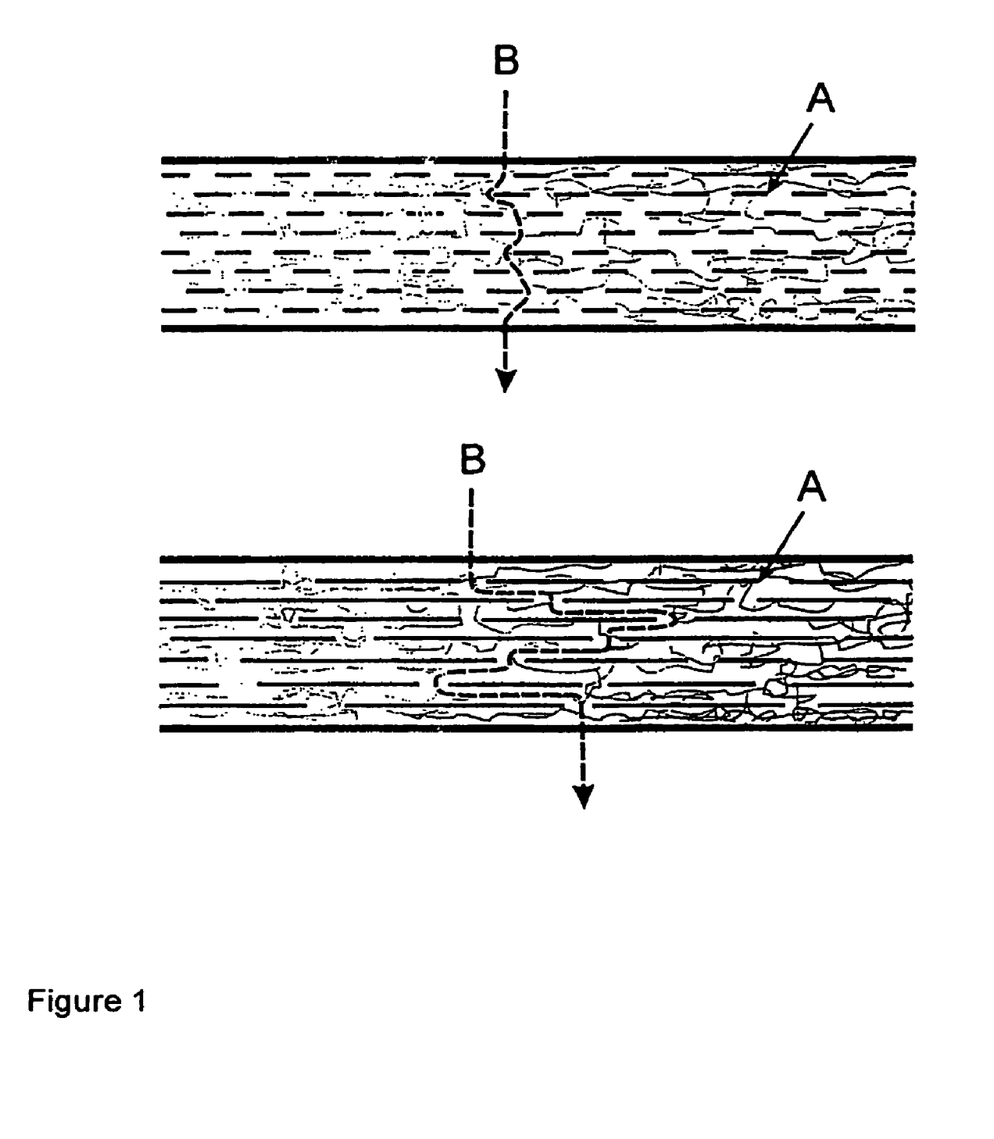
FIG. 1 shows the orientation of particles in the composite membrane material

As schematically shown in FIG. 1, the presence of suitably oriented particles (A) modifies the path of the diffusing molecule (B): the larger the particle surface, the longer the path. It can therefore be expected that the ionomer permeability to methanol decreases when it is filled with lamellar particles, in agreement with the effect experimentally found for zirconium phosphate in the above international patent. However, it can be observed that, in the above patent, the importance of size and orientation of the lamellar particles was not well understood. In addition, since zirconium phosphate is completely insoluble in known solvents, its insertion was carried out by in situ precipitation. This does not allow to control the orientation, the size and the exfoliation of the lamellar particles.

It was therefore recognized the need of inserting zirconium phosphate in ionomeric matrices by using a completely different procedure which makes it possible to obtain uniform dispersions of lamellar particles having desired size and oriented prevalently parallel to the membrane faces. However, since zirconium phosphate has a relatively low proton conductivity, its dispersion in an ionomer of high proton conductivity may be associated with a decrease of the overall conductivity, especially for high loadings of inorganic particles.

In order not to decrease, and possibly to increase the ionomer conductivity, there is the need of modifying the proton conducting membranes of the state of art by dispersing, in the polymeric matrix, lamellar hydrophilic components exhibiting proton conductivity comparable with, or higher than, the conductivity of the ionomer where they have to be dispersed. Since lamellar compounds with high proton conductivity are very insoluble, in this case too it was recognized the need of finding a procedure, different from the in situ precipitation, suitable to disperse uniformly and with the right orientation lamellar particles in the polymeric matrix.

It is known from the literature (G. Alberti, M. Casciola, U. Costantino, A. Peraio, E. Montoneri, Solid State Ionics 50 (1992) 315; G. Alberti, L. Boccali, M. Casciola, L. Massinelli, E. Montoneri, Solid State Ionics 84 (1996) 97) that some α- or γ-layered zirconium phosphate sulfoarylenphosphonates exhibit proton conductivity up about 0.1 S cm$^{-1}$. These compounds are represented by the general formulae $Zr(O_3POH)_{2-x}(O_3P-Ar)_x \cdot nH_2O$, with $0<x\leq2$ (α-type compounds), or $Zr(PO_4)(O_2P(OH)_2)_{1-x}(HO_3P-Ar)_x \cdot nH_2O$, with $0<x\leq1$ (γ-type compounds), where Ar is an arylensulfonated group. The inventors have recognised that these compounds must be considered more hydrophilic than silica due to the super acidic character of the sulfonic function.

Powders of amorphous zirconium phosphate metasulfophenylenphosphonates of composition $Zr(O_3POH)_{2-x}(O_3P-Ar)_x \cdot nH_2O$, with $x=1$ and 1.5, supported by sulfonated poly-ether-ether-ketone were already used for the preparation of composite membranes containing 40% proton conductor without any loss of the ionomer conductivity (E. Bonnet, D. J. Jones, J. Rozière, L. Tchicaya, G. Alberti, M. Casciola, L, Massinelli, B. Bauer, A. Peraio, E. Ramunni, J. New Mat. Electrochem. Systems, 3 (2000) 87). Similar results were also obtained for Nafion 1100 membranes loaded with powder of an α-titanium phosphate metasulfophenylenphosphonate up to 20% (G. Alberti, U. Costantino, M. Casciola, S. Ferroni, L. Massinelli, P. Staiti, Solid State Ionics 145 (2001) 249).

It was now surprisingly found that both amorphous and α- or γ-layered zirconium phosphate as well as zirconium phosphate metasulfoarylenphosphonates form stable colloidal dispersions in some organic solvents (e.g. N,N'-dimethylformamide (DMF), N-methyl-2-pyrrolidone (NMP), dimethylsulfoxide, acetonitrile, alkanols) or in their mixtures with water.

It was also surprisingly found that α-zirconium phosphate $Zr(O_3POH)_2$, after a suitable process of intercalation-deintercalation of propylamine, can be dispersed in dimethylformamide or N-methylpyrrolidone. Moreover, depending on the crystallinity degree of the starting material and on the conditions used in the deintercalation process, it is possible to obtain dispersions of lamellar particles with thickness ranging from ca. 5 to ca. 100 nm, preferably 5–10 nm, and surface area from ca. 0.1 to ca. 10 μm², especially 0.2–1 μm².

The availability of the above colloidal dispersions is a good starting point to disperse uniformly α-zirconium phosphate or zirconium phosphate-sulfoarylenphosphonates into a polymeric matrix. In addition, since the size of the lamellar particles in these dispersions depends to a great extent on the size of the particles of the starting material, it is possible to fill the polymeric matrix with lamellar particles of controlled size and shape. As mentioned above, this is a clear advantage in comparison with the in situ formation of α-zirconium phosphate reported in the already cited international patent WO96/7952 and appears to be particularly important in order to control the reduction of membrane permeability to the fuel and specifically to methanol.

It is an object of the present invention to provide a composite membrane material made of an ionomer of the state of art and of a layered zirconium phosphate sulfoarylenphosphonate exhibiting proton conductivity comparable with, or possibly higher than, the conductivity of the pure ionomeric membrane material. The conductivity of the zirconium phosphate containing membrane material is $>5 \times 10^{-4}$ S cm$^{-1}$ at temperatures of 0° C. to 200° C. In one embodiment conductivity of a modified zirconium phosphate, especially zirconium phosphate sulfoarylenphosphonate, containing membrane material is $>10^{-2}$ S cm$^{-1}$ at 70° C. and 95% relative humidity.

It is a further object of the present invention to provide a composite membrane material made of an ionomer of the state of art filled with well-dispersed lamellar particles of α-zirconium phosphate of controlled thickness and surface.

It is a further object of the present invention to provide a procedure for the preparation of a composite membrane material made of the said ionomer and of a zirconium phosphate, preferably a layered zirconium phosphate, especially α-zirconium phosphate, or of a zirconium phosphate sulfoarylenphosphonate, starting from a solution of the ionomer and from a colloidal dispersion of α-zirconium phosphate or of the said zirconium phosphate sulfoarylenphosphonate.

The invention concerns in one aspect the preparation of a colloidal dispersion of α-zirconium phosphate or of a proton conducting zirconium phosphate sulfoarylenphosphonate in a suitable solvent or mixture of solvents, and in the subsequent transfer of the colloidal particles into a solution of a polymer, especially an ionomer, of the state of art. The mixture thus obtained is cast on the surface of a smooth plane support and the solvent is removed by heating or by using a suitable non-solvent. Transfer of the colloidal particles into the polymer, especially ionomer, solution can be carried out (1) by mixing the polymer, especially the ionomer, solution with the colloidal dispersion or (2) by means of "phase transfer". It is possible to use noncharged polymers as conductivity is contributed by the zirconium phosphate. Preferably there are used ionomers, especially sulfonated polymers due to their conductivity at low temperatures (<100° C.). There can be used perfluorosulfonic polymers, especially Nafion, Hyflon or Sterion, sulfonated polyvinylidenfluoride, sulfonated polyetherketones, especially sPEK, sPEEK, sPEKK, sPPEK, sPEEKK or sPEKEKK, sulfonated polybenzimidazoles, sulfonated polysulfones sulfonated polyphenylsulfones and sulfonated polyethersulfones. In case (1) the same solvent can be used for the solution and the dispersion. Alternatively, if different solvents are used for the solution and the dispersion, it must be avoided that the solvent of the polymer may provoke colloid flocculation and the solvent of the colloidal dispersion may cause polymer precipitation.

The overall content of zirconium phosphate in the membrane material is 0,5%–70%, preferably 5%–40%, especially 10%–25% by weight. For the use as direct methanol fuel cells content of zirconium phosphate is about 10 wt %–20 wt %, especially 12 wt % to 15 wt %, were as for high temperature fuel cells, especially hydrogen fuel cells, a zirconium phosphate of up to 30 wt %, preferably up to 25 wt %, is used.

For direct methanol fuel cells there is employed a mixture of large and small dies, whereas the large dies prevent from methanol permeating the membrane and the small dies prevent from reagglomeration of the large dies. For high temperature fuel cells, especially hydrogen fuel cells, there are employed solely small dies.

The diameter of the large dies is in the range from 0,1 to 1 μm whereas the diameter of the small dies is about 10–50 nm.

For medium temperature fuel cells dispersed, amorphous as well as semi-crystalline zirconium phosphate is applied. The diameter rages from 10–50 nm.

Semi-crystalline zirconium phosphate material enhances mechanical stability and limits swelling in x- and y-plane. Diameter can be up to 100–500 nm.

Crystalline zirconium phosphate material is suitable for direct methanol fuel cells with diameters of 1–10 μm.

The thickness of the zirconium phosphate and zirconium phosphate sulfoarylenphosphonate dies ranges in the scale of single molecule layers. The overall thickness of the composite membranes is between 10 μm and 100 μm, preferably 30–60 μm.

An object of the invention are preferably also membranes comprising the composite membrane material for fuel cells or in fuel cells.

Another object of the invention are further fuel cells comprising the composite membrane material.

The following examples have the purpose of facilitating the understanding of the invention, and do not intend to limit in any manner its scope, which is solely defined by the appended claims.

EXAMPLES

Example 1

Preparation of a Composite Membrane Material made of Sulfonated Polyetherketone/α-zirconium Phosphate by Mixing the Ionomer Solution in NMP With a Colloidal Dispersion of α-zirconium Phosphate in DMF a) A colloidal dispersion of α-zirconium phosphate intercalated with propylamine(Zr(O$_3$POH)$_2$.C$_3$H$_7$NH$_2$) in water is prepared according to G. Alberti, M. Casciola and U: Costantino, J. Colloid and Interface Science 107 (1985) 256. The dispersion is treated with 1M HCl so that pH<2. The solid is separated from the solution and washed with dimethylformamide under vigorous stirring. A gelatinous precipitate, containing 4% anhydrous α-zirconium phosphate, settles by centrifugation at 3000 rpm. Washing is repeated up to elimination of chloride ions.

b) A weighed amount of sulfonated polyetherketone with ion exchange capacity 1.3 meg/g (s-PEK1.3), corresponding to 9 g of anhydrous ionomer, is dissolved in NMP under nitrogen atmosphere at 130° C. 25 g of the above gelatinous precipitate of α-zirconium phosphate are dispersed into the polymer solution. This mixture is used to prepare a membrane material by means of an Erichsen semi/automatic film casting processor. The solvent is removed by heating 1 hour at 80° C. and 30 minutes at 120° C. The membrane material thus obtained (thickness 0.035 mm, 10% inorganic particles) is kept in water.

Example 2

Preparation of a Composite Membrane Material made of s-PEK/Zirconium Phosphate Sulfophenylenphosphonate by Mixing the Ionomer Solution in DMF with a Colloidal Dispersion of the Zirconium Phosphate Sulfophenylenphosphonate in the Same Solvent.

a) Preparation of Zr(O$_3$POH)$_{0.6}$(O$_3$PC$_6$H$_4$SO$_3$H)$_{1.4}$ 7.5 ml of 1M H$_3$PO$_4$ and 15 ml of 1M metasulfophenylenphosphonic acid are mixed and concentrated by heating overnight at 80° C. The dense solution thus obtained is mixed with 50 ml of acetonitrile and water is added until a clear solution is obtained. 13.6 ml of an aqueous solution of 0.75M ZrOCl$_2$ are then added drop wise to the acetonitrile solution. The white precipitate thus formed is held under vigorous stirring for half an hour and washed two times with 2M HCl (2×50 ml) and two times with acetonitrile (2×50 ml). The slurry, obtained after centrifugation at 3000 rpm, is used for the preparation of a colloidal dispersion in DMF.

b) Preparation of a Colloidal Dispersion of Zr(O$_3$POH)$_{0.6}$(O$_3$PC$_6$H$_4$SO$_3$H)$_{1.4}$ in DMF A weighed amount of the above slurry is mixed with an equal amount of DMF and stirred overnight. The mixture is left at rest for one day to allow sedimentation of the solid. The supernatant colloidal dispersion contains 9% Zr(O$_3$POH)$_{0.6}$(O$_3$PC$_6$H$_4$SO$_3$H)$_{1.4}$, 50% DMF and 41% acetonitrile.

c) Membrane Material Preparation

A weighed amount of s-PEK1.3 (corresponding to 1.2 g of anhydrous ionomer) is dissolved under vigorous stirring in 8 g of NMP at 130° C. Subsequently, 3.37 g of the colloidal dispersion described in b) are mixed with 9.05 g of the s-PEK1.3 solution. This mixture is held under stirring for half an hour and then cast on a glass plate. The solvent is evaporated as indicated in example 1. The membrane material thus obtained (thickness 0.05 mm, 20% of inorganic material) is kept in water.

The membrane material conductivity at 100° C. is $1.2 \cdot 10^{-3}$ S cm$^{-1}$ and $1.3 \cdot 10^{-2}$ S cm$^{-1}$ at 80% and 100% relative humidity, respectively.

Comparative Example 2

The polymer solution used in example 1 is cast on a glass plate. The film thus obtained is heated one hour at 80° C. and half an hour at 120° C. The resulting membrane material is detached by immersing the glass plate in water. The membrane material conductivity at 100° C. is $1.1 \cdot 10^{-3}$ S cm$^{-1}$ and $1.1 \cdot 10^{-2}$ S cm$^{-1}$ at 80% and 100% relative humidity, respectively.

Example 3

Preparation, by Phase Transfer, of a Membrane Material of Amorphous Zirconium Phosphate Sulfophenylenphosphonate Dispersed in Sulfonated Polyetherketone.

The gelatinous precipitate of example 1a is first heated at 80° C. and then at 120° C. to remove acetonitrile. An aqueous dispersion of 20% anhydrous zirconium phosphate sulfophenylenphosphonate is held under stirring for 1 hour, and then left at rest for two hours to allow sedimentation of the largest particles. The liquid phase is decanted off. This phase contains 15% Zr(O$_3$POH)$_{0.6}$(O$_3$PC$_6$H$_4$SO$_3$H)$_{1.4}$. An amount of 1.05 g of s-PEK1.3 is dissolved under vigorous stirring in 8 g of an appropriate solvent, for example, NMP, DMF or dimethylsulfoxide, at 130° C. The above aqueous dispersion is mixed with the polymer solution so that the weight percent of inorganic material in dry membrane material is in the range 1–40%, preferably 5–30%. The lower boiling solvent is removed by evaporation and the inorganic material passes from the aqueous to the organic phase. The single phase product obtained is cast on a glass support and the resulting film dried as described in example 1.

The conductivity of a membrane material containing 10% of inorganic material at 100° C. and 80% relative humidity is $1.3 \cdot 10^{-3}$ S cm$^{-1.}$ Example 4

Preparation of a Perfluorosulfonic Acid (PFSA) Hybrid Membrane for Medium Temperature Fuel Cells Containing 3 wt. % of Amorphous α-zirconium Phosphate (ZrP)

29,12 g of a 10 wt. % solution of the Li-form of the perfluorosulfonic acid polymer PFSA (Nafion®, EW 1150)

in N-methyl-2 pyrrolidone (NMP) and 1,2 g of a 10 wt. % gel of amorphous exfoliated ZrP in NMP/$H_2O$ are mixed by carefully adding the colloidal dispersion of exfoliated ZrP in small quantities under vigorous stirring into the PFS-Li solution. After filtration of the mixture through a 10 μm filter, a film is prepared on a glass plate using a doctor blade (gap: 600 μm, feed rate: 10 mm/s).

After applying following drying protocol and delamination from the glass plate, a film of 50–60 μm thickness is obtained.

Drying protocol: 30 min at 50° C., then 30 min at 60° C., then 30 min 80° C., then 30 min 120° C.

Before further characterisation, the film was carefully conditioned in 1M $H_2SO_4$, then repeatedly washed in demineralised water until neutral pH was obtained.

Figure 2:
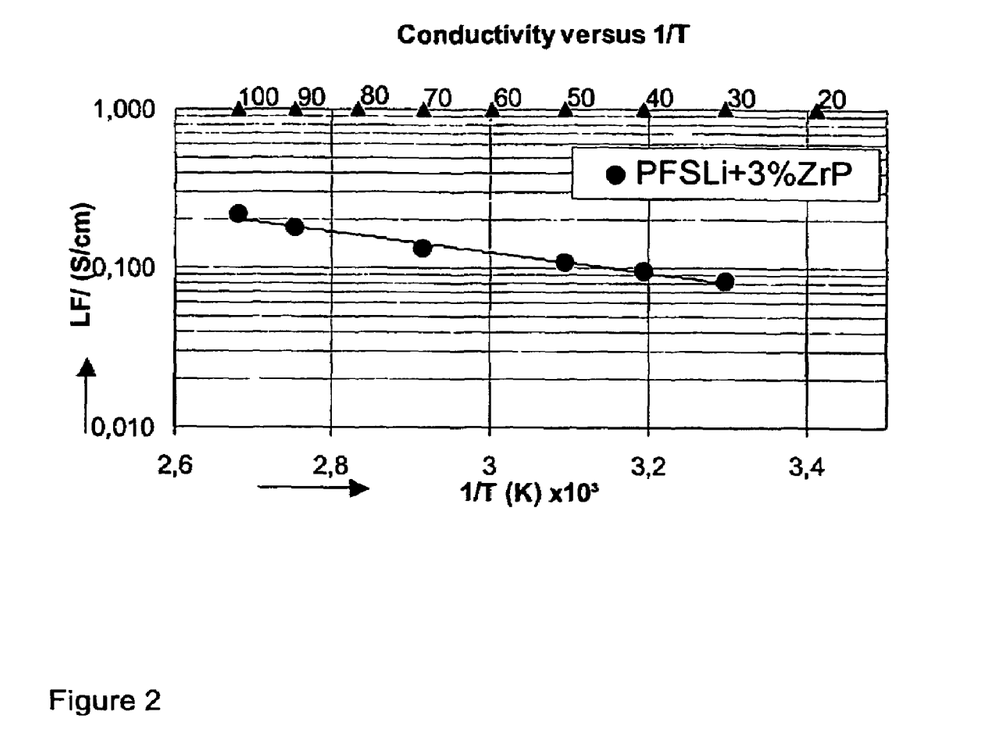
FIG. 2 shows conductivity behaviour of PFSA+3% ZrP

The following conductivity behaviour (FIG. 2) was obtained in a temperature controlled measuring cell under full humidification.

Example 5

Preparation of a Copolyetherketone Hybrid Membrane for Direct Methanol Fuel Cells Containing 20 wt. % of Semi Crystalline α-zirconium Phosphate (ZrP)

19,45 g of a 15 wt. % solution of the polyphthalazinoneetherketone polymer (PPEK) (EW 900) in NMP and 5,72 g of a 14 wt.-% gel of semi crystalline exfoliated ZrP in DMF/$H_2O$ is mixed by carefully adding the ZrP-gel in small quantities under vigorous stirring into the PPEK solution. After filtration of the mixture through a 40 μm filter, a film is prepared on a glass plate using a doctor blade (gap: 600 μm, feed rate: 10 mm/s).

After applying following drying protocol and delamination from the glass plate, a film of 50–60 μm thickness is obtained.

Drying protocol: 30 min at 80° C., then 60 min 120° C.

Before further characterisation, the film was delaminated in demineralised water.

Figure 3:
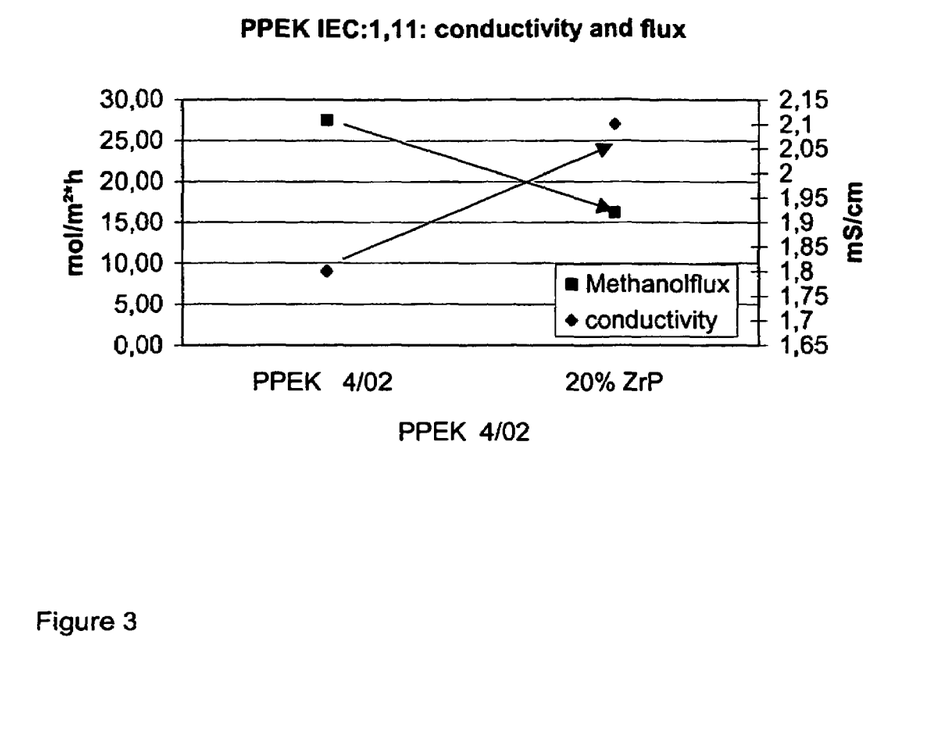
FIG. 3 shows conductivity of PPEK+20% ZrP

The following conductivity (FIG. 3) is measured in a conductivity cell in 0,5 Mol NaCl and the flux of methanol in a diffusion cell applying a feed concentration of 5 Mol/l $CH_3OH$ versus demineralised water at 50° C.

Example 6

Preparation of a Polyetheretherketone (PEEK) Hybrid Membrane for Direct Methanol Fuel Cells Containing 20 wt. % of Crystalline α-zirconium Phosphate (ZrP)

29,12 g of a 10 wt. % in DMSO solution of the H-form of a sulfonated Victrex PEEK polymer (EW 735) and 7,3 g of a 10 wt.-% gel of crystalline ZrP in DMF/$H_2O$ is mixed by carefully adding the ZrP-gel in small quantities under vigorous stirring into the s-PEEK solution. After filtration of the mixture through a 40 μm filter, a film is prepared on a glass plate using a doctor blade (gap: 600 μm, feed rate: 10 mm/s).

After applying following drying protocol and delamination from the glass plate, a film of 50–60 μm thickness is obtained.

Drying protocol: 30 min at 60° C., then 30 min at 80° C., then 30 min 80° C., then 30 min 120° C.

Before further characterisation, the film was carefully conditioned in 1M $H_2SO_4$, then repeatedly washed in demineralised water until neutral pH was obtained.

Figure 4:
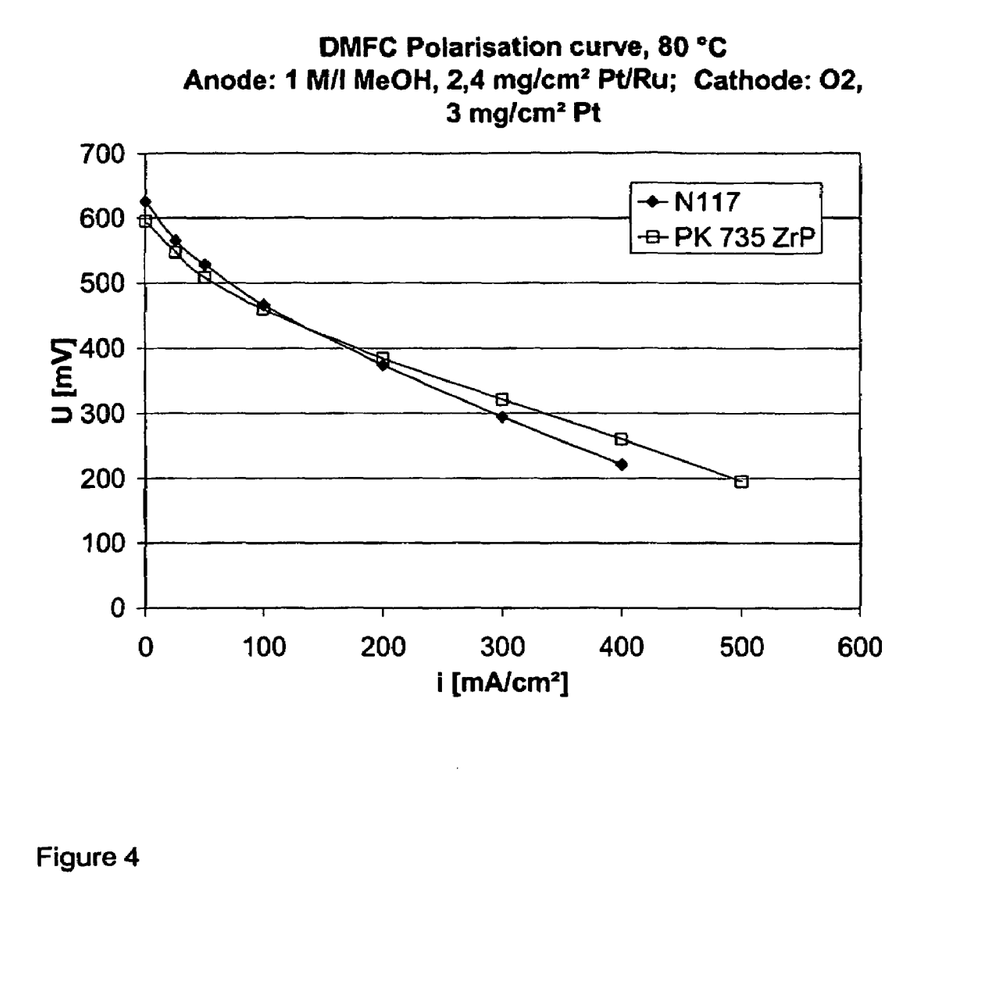
FIG. 4 shows polarisation curve of s-PEEK+20% ZrP compared to Nafion 117

The following polarisation curve (FIG. 4) was obtained compared to a Nafion 117 film from Dupont, in a single cell (20 $cm^2$) at 80° C. under DMFC (direct methanol fuel cell)-conditions: Anode 1 Mol/l methanol in water. Cathode $O_2$. Electrodes: Anode: 2,4 mg/$cm^2$ Pt/Ru; Cathode: 3 mg/$cm^2$ Pt.

Example 7

Preparation of a Perfluorosulfonic Acid (PFSA) Hybrid Membrane for Medium Temperature Fuel Cells Containing 10 wt. %. of Zirconium Phosphate Sulfophenylenphosphonate (ZrSPP)

1 g ZrSPP is solubilised in 10 ml $H_2O$. 20 ml NMP is added and the mixture is reduced in volume to 61% at 80° C. A clear solution is obtained. 25 g of a 10 wt. % in NMP solution of the Li-form of the perfluorosulfonic acid polymer PFSA (Nafion®, EW 1150) and 6 g of the afore mentioned ZrSPP solution is mixed by carefully adding the ZrSPP-solution in small quantities under vigorous stirring. After filtration of the mixture through a 40 μm filter, a film is prepared on a glass plate using a doctor blade (gap: 600 μm, feed rate: 10 mm/s).

After applying following drying protocol and delamination from the glass plate, a film of 50–60 μm thickness is obtained.

Drying protocol: 30 min at 50° C., then 30 min at 60° C., then 30 min 80° C., then 30 min 120° C.

Before further characterisation, the film was carefully conditioned in 1M $H_2SO_4$, then repeatedly washed in demineralised water until neutral pH was obtained.

Figure 5:
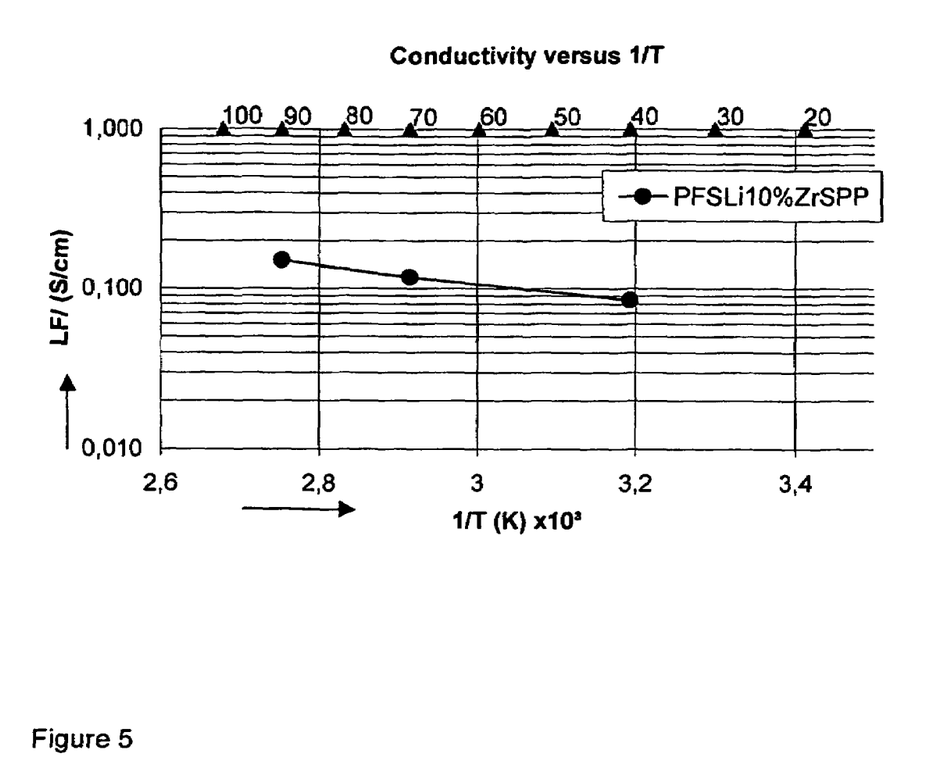
FIG. 5 shows conductivity behaviour of PFS-Li+10% ZrSPP
Figure 6:
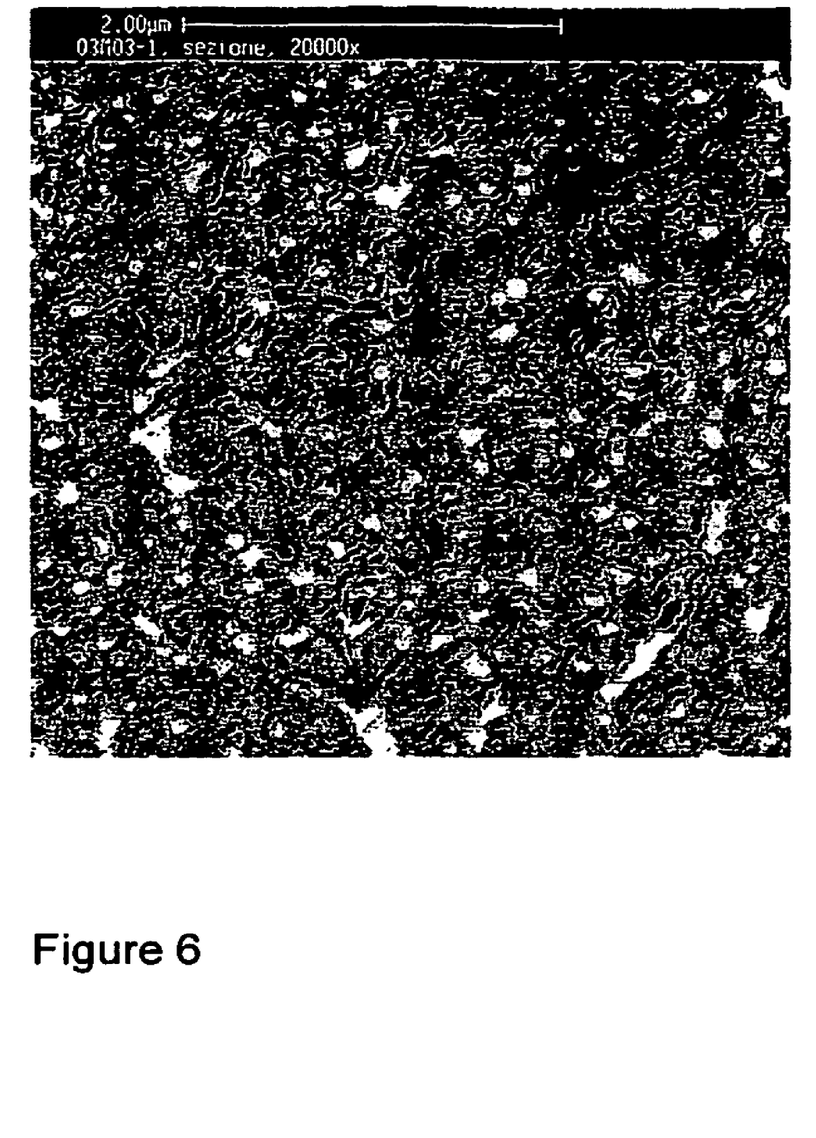
FIG. 6 shows an 20.000× magnification of s-PEK+20% $Zr(SPP)_{1.3}$
Figure 7:
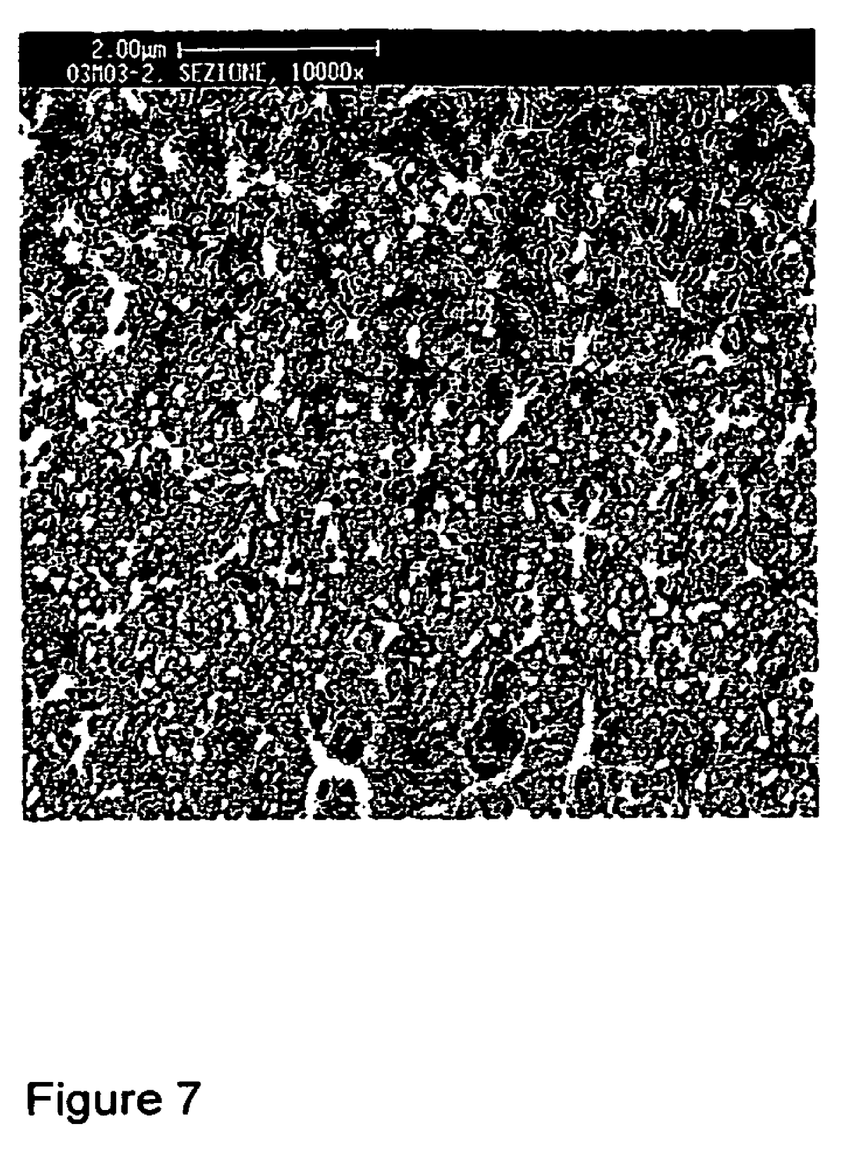
FIG. 7 shows an 10.000× magnification of s-PEK+10% Zr(SPP)$_{1.3}$

The following conductivity behaviour (FIG. 5) was obtained in a temperature controlled measuring cell under full humidification.

Example 8

Preparation of a Polyetherketone (PEK) Hybrid Membrane for Medium Temperature Fuel Cells Containing 10% wt. of Zirconium Phosphate Sulfophenylenphosphonate (ZrSPP)

1 g of ZrSPP is solubilised in 10 ml $H_2O$. 20 ml NMP is added and the mixture is reduced in volume to 61% at 80° C. A clear solution of 5 wt. % is obtained. 29,12 g of a 10 wt.-% in NMP solution of the H-form of a sulfonated PEK polymer (equivalent weight: 735 g/equivalent) and 14,6 g of the afore mentioned ZrSPP solution is mixed by carefully adding the ZrSPP-solution in small quantities under vigorous stirring into the s-PEKK solution.

After filtration of the mixture through a 40 μm filter, a film is prepared on a glass plate using a doctor blade (gap: 600 μm, feed rate: 10 mm/s).

After applying following drying protocol and delamination from the glass plate, a film of 50–60 μm thickness is obtained.

Drying protocol: 30 min at 60° C., then 30 min at 80° C., then 30 min 80° C., then 30 min 120° C.

Before further characterisation, the film was carefully conditioned in 1M $H_2SO_4$, then repeatedly washed in demineralised water until neutral pH was obtained.

Figure 8:
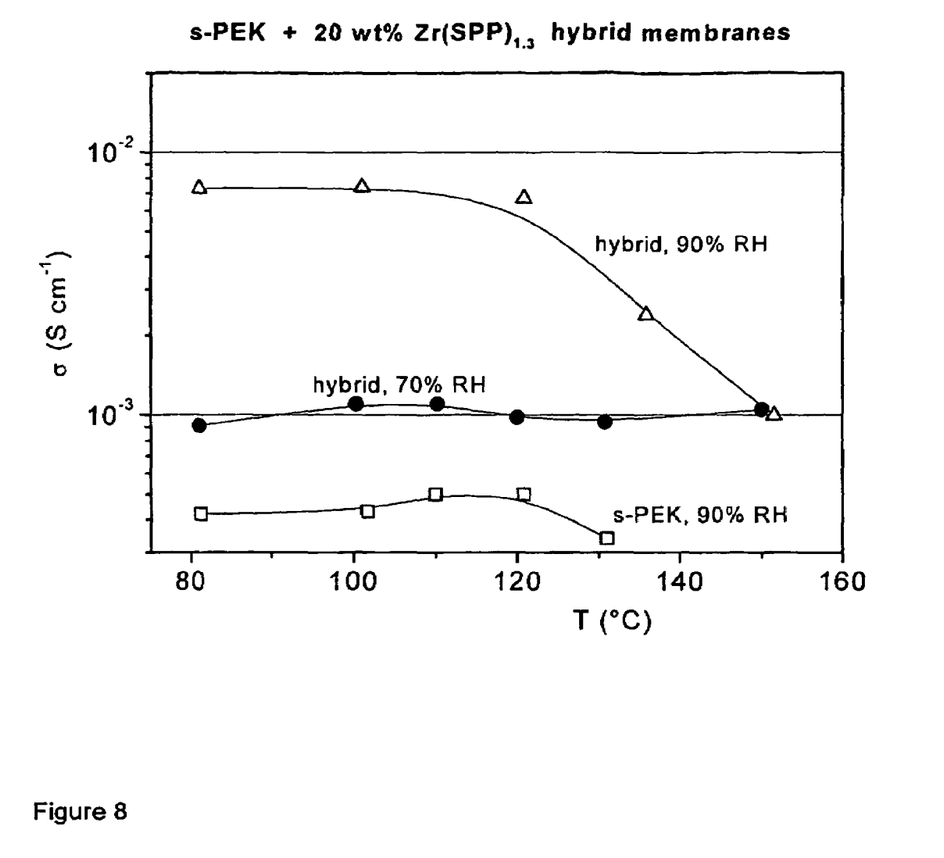
FIG. 8 shows conductivity of S-PEK+20% ZrSPP

The following conductivity (FIG. 8) was obtained at reduced humidity (90%). The reference measurement is given as s-PEK.

Example 9

Preparation of a Sulfonated Polyetherketoneketone (s-PEKK) Hybrid Membrane for Direct Methanol Fuel Cells Containing 20 wt. % of Crystalline Zirconium Phosphate Sulfophenylenphosphonate (ZrSPP)

30,22 g of a 10 wt. % in NMP solution of the polyetherketoneketone (PEKK) polymer (equivalent weight: 775 g/equivalent) and 10,78 g of a 7 wt. % gel of amorphous exfoliated ZrSPP in DMF/H$_2$O is mixed by carefully adding the ZrSPP-gel in small quantities under vigorous stirring into the PEKK solution.

After filtration of the mixture through a 40 µm filter, a film is prepared on a glass plate using a doctor blade (gap: 600 µm, feed rate: 10 mm/s).

After applying following drying protocol and delamination from the glass plate, a film of 50–60 µm thickness is obtained.

Drying protocol: 30 min at 60° C., 30 min at 80° C., then 60 min 120° C.

Figure 9:
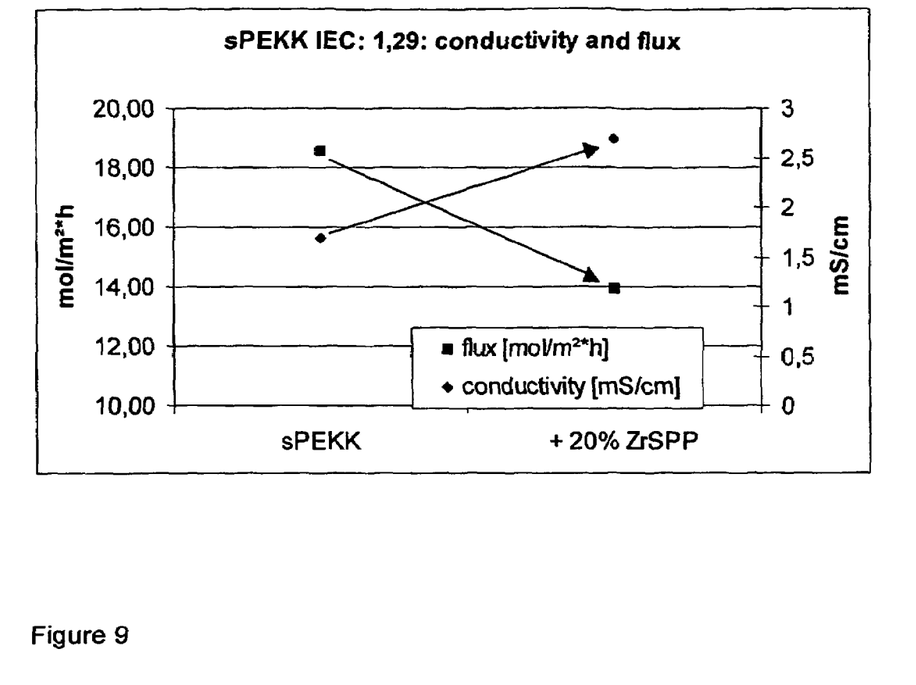
FIG. 9 shows conductivity of s-PEKK+20% ZrSPP

The following conductivity (FIG. 9) was obtained in 0,5 Mol NaCl and flux of methanol was measured in a diffusion cell applying a feed concentration of 5 Mol/l CH$_3$OH versus demineralised water at 50° C.

The invention claimed is:

1. A method for the preparation of a proton conducting composite membrane material based on the following steps: a) preparation of layered particles of zirconium phosphate of the general formula Zr(O$_3$POH)$_2$ or zirconium phosphate sulfoarylene phosphonate in the form of a mixture of small and large dies by exfoliation of the phosphates in aqueous solution by intercalation-deintercalation of an alkylamine, b) preparation of a colloidal dispersion of the layered particles in a suitable organic solvent or mixture of organic solvents, c) transferring of the layered particles from the said colloidal dispersion to a solution of a polymer by mixing, d) forming membrane materials with oriented particles by using the obtained mixture and eliminating the solvent;
wherein the particles are exfoliated to a thickness from ca. 5 nm to 100 nm.

2. The method for the preparation of the proton conducting composite membrane material according to claim 1 wherein the polymer is an ionomer.

3. The method for the preparation of the proton conducting composite membrane material according to claim 1 wherein the polymer is an ionomer of the membrane material is that of a proton conducting ionomer.

4. The method for the preparation of the proton conducting composite membrane material according to claim 1 is at least one synthetic ionomer selected from the group consisting of perfluorosulfonic polymers, sulfonated polyvinylidenefluoride, sulfonated polyetherketones, sulfonated polybenzimidazoles, sulfonated polyphenylsulfones, sulfonated polysulfones and sulfonated polyethersulfones.

5. The method for the preparation of the proton conducting composite membrane materials according to claim 1 wherein the mixture containing the polymer and the layered particles is obtained by mixing the ionomer solution with the colloidal dispersion of the layered particles.

6. The method for the preparation of the proton conducting composite membrane material according to claim 1 wherein the colloidal dispersion of the layered particles is obtained by using at least one organic solvent selected from the group consisting of N,N'-dimethylformamide, N-methyl-2-pyrrolidone, dimethylsulfoxide, acetonitrile and alkanols, preferably N,N'-dimethylformamide and/or N-methyl-2-pyrrolidone, or their mixtures or water or mixtures of water and organic solvent.

7. The method for the preparation of the proton conducting composite membrane material according to claim 1 wherein a ionomer solution and the colloidal dispersion are prepared in the same solvent or in different solvents, provided that the mixing of the solution with the dispersion does not cause colloid flocculation or ionomer precipitation.

8. The method for the preparation of the proton conducting composite membrane material according to claim 1 wherein the mixture containing an ionomer and the layered particles is obtained by "phase transfer".

9. The method for the preparation of the proton conducting composite membrane materials according to claim 1 wherein the solvent is removed from the polymer-colloid mixture by evaporation.

10. The method for the preparation of the proton conducting composite membrane material according to claim 1 wherein the solvent is removed from the polymer-colloid mixture by the use of a non-solvent.

11. The method for the preparation of the proton conducting composite membrane material according to claim 10 wherein the non-solvent is water.

12. A method for the preparation of the proton conducting composite membrane material based on the following steps: a) preparation of layered zirconium phosphate sulfoarylene phosphonate in the form of a mixture of small and large particles by direct exfoliation in aqueous solution by intercalation-deintercalation of an alkylamine, b) preparation of a colloidal dispersion of the layered particles in a suitable organic solvent or mixture of organic solvents, c) transferring of the layered particles from said colloidal dispersion to a solution of a polymer by mixing, d) forming membrane materials with oriented particles by using the obtained mixture and eliminating the solvent;
wherein the particles are exfoliated to a thickness of ca. 5 nm to 100 nm.

13. The method for the preparation of the proton conducting composite membrane material according to claim 12 wherein the polymer is an ionomer.

14. The method for the preparation of the proton conducting composite membrane material according to claim 12 wherein the polymer is an ionomer of the membrane material is that of a proton conducting ionomer.

15. The method for the preparation of the proton conducting composite membrane material according to claim 12 is at least one synthetic ionomer selected from the group consisting of perfluorosulfonic polymers, sulfonated polyvinylidenefluoride, sulfonated polyetherketones, sulfonated polybenzimidazoles, sulfonated polyphenylsulfones, sulfonated polysulfones and sulfonated polyethersulfones.

16. The method for the preparation of the proton conducting composite membrane materials according to claim 12 wherein the mixture containing the polymer and the layered particles is obtained by mixing the ionomer solution with the colloidal dispersion of the layered particles.

17. The method for the preparation of the proton conducting composite membrane material according to claim 12 wherein the colloidal dispersion of the layered particles is obtained by using at least one organic solvent selected from the group consisting of N,N'-dimethylformamide, N-methyl-2-pyrrolidone, dimethylsulfoxide, acetonitrile and alkanols, preferably N,N'-dimethylformamide and/or N-methyl-2-pyrrolidone, or their mixtures or water or mixtures of water and organic solvent.

18. The method for the preparation of the proton conducting composite membrane material according to claim 12 wherein a ionomer solution and the colloidal dispersion are prepared in the same solvent or in different solvents, provided that the mixing of the solution with the dispersion does not cause colloid flocculation or ionomer precipitation.

19. The method for the preparation of the proton conducting composite membrane material according to claim 12 wherein the mixture containing an ionomer and the layered particles is obtained by "phase transfer".

20. The method for the preparation of the proton conducting composite membrane materials according to claim 12 wherein the solvent is removed from the polymer-colloid mixture by evaporation.

21. The method for the preparation of the proton conducting composite membrane material according to claim 12 wherein the solvent is removed from the polymer-colloid mixture by the use of a non-solvent.

22. The method for the preparation of the proton conducting composite membrane material according to claim 21 wherein the non-solvent is water.

* * * * *